US012698003B2

(12) United States Patent
Panigrahi et al.

(10) Patent No.: US 12,698,003 B2
(45) Date of Patent: Aug. 4, 2026

(54) AUTOMATED VEHICLE CONTROL DURING FINAL ASSEMBLY AND DISPATCH

(71) Applicant: Ford Global Technologies, LLC, Dearborn, MI (US)

(72) Inventors: Smruti Panigrahi, Novi, MI (US); Gregory P. Linkowski, Dearborn, MI (US); Meghna Menon, Ann Arbor, MI (US); Mario Anthony Santillo, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 152 days.

(21) Appl. No.: 18/408,446

(22) Filed: Jan. 9, 2024

(65) Prior Publication Data

US 2025/0222957 A1      Jul. 10, 2025

(51) Int. Cl.
| | |
|---|---|
| *G07C 5/08* | (2006.01) |
| *B60W 50/00* | (2006.01) |
| *B60W 60/00* | (2020.01) |
| *G06N 3/08* | (2023.01) |

(52) U.S. Cl.
CPC ........ *B60W 60/0025* (2020.02); *B60W 50/00* (2013.01); *G06N 3/08* (2013.01); *G07C 5/0808* (2013.01); *B60W 2050/0083* (2013.01); *B60W 2420/403* (2013.01); *B60W 2520/10* (2013.01); *B60W 2552/40* (2020.02); *B60W 2556/50* (2020.02); *B60W 2720/30* (2013.01)

(58) Field of Classification Search
CPC ............. B60W 60/0025; B60W 50/00; B60W 2050/0083; B60W 2420/403; B60W 2520/10; B60W 2552/40; B60W 2556/50; B60W 2720/30; B60W 2050/0057; B60W 30/182; B60W 2050/0088; B60W 60/001; G06N 3/08; G05D 1/43; G05D 1/243; G05D 1/644; G05D 1/65; G05D 2109/10; G07C 5/0808; B60Y 2300/22
See application file for complete search history.

(56) References Cited

U.S. PATENT DOCUMENTS

| | | | |
|---|---|---|---|
| 10,055,903 B2 | 8/2018 | Koons et al. | |
| 10,757,000 B2 | 8/2020 | Gelvin et al. | |
| 2017/0327109 A1* | 11/2017 | Watanabe | B60W 50/12 |
| 2021/0373161 A1* | 12/2021 | Lu | G06T 7/579 |
| 2023/0145508 A1 | 5/2023 | Kaphengst et al. | |
| 2024/0140481 A1* | 5/2024 | Kaste | B60W 30/025 |

* cited by examiner

*Primary Examiner* — Ramya P Burgess
*Assistant Examiner* — Chanmin Park
(74) *Attorney, Agent, or Firm* — Burris Law, PLLC

(57) ABSTRACT

A method of controlling an autonomously operated vehicle along a test track including the extraction of frequency characteristics of a vehicle, the determination of one or more driving profiles based on the frequency characteristics and a deep learning model, the causation of the vehicle to select at least one of the one or more driving profiles based on at least one of a plurality of track segments along the test track, and the control of the vehicle's movement along the test track based on the vehicle selecting the at least one of the one or more driving profiles and the at least one of the plurality of track segments.

20 Claims, 7 Drawing Sheets

400

406

402

404

408

410

700

EXTRACTING FREQUENCY
CHARACTERISTICS OF A VEHICLE
702

DETERMINING ONE OR MORE DRIVING
PROFILES
704

CAUSING THE VEHICLE TO SELECT AT LEAST
ONE OF THE ONE OR MORE DRIVING
PROFILES
706

CONTROLLING MOVEMENT OF THE VEHICLE
ALONG THE TEST TRACK
708

AUTOMATED VEHICLE CONTROL DURING FINAL ASSEMBLY AND DISPATCH

FIELD

The present disclosure relates to the automated marshaling of one or more vehicles along test tracks. More specifically, the present disclosure relates to the generation of one or more unique driving profiles associated with each of the test tracks.

BACKGROUND

The statements in this section merely provide background information related to the present disclosure and may not constitute prior art.

Vehicle manufacturing companies marshal vehicles along test tracks to obtain audio and/or vibrational associated feedback to determine whether such feedback exceeds an acceptable threshold. The marshaling of these vehicles along the test tracks are done via manual operation, which necessitates the employment of numerous human operators and requires these operators to work countless hours to ensure every vehicle is properly tested. Additionally, as the marshaling of these vehicles is done via manual operation, whether the audio and/or vibrational associated feedback exceeds the acceptable threshold is subjective based on the discretion of the operator of a specific vehicle.

The present disclosure addresses these and other issues related to marshaling vehicles.

SUMMARY

This section provides a general summary of the disclosure and is not a comprehensive disclosure of its full scope or all of its features.

The present disclosure provides a method of controlling an autonomously operated vehicle along a test track, the method comprising: extracting frequency characteristics associated with the vehicle; determining, based on the frequency characteristics and a deep learning model, one or more driving profiles; causing, based on at least one track segment of a plurality of track segments along the test track, the vehicle to select at least one of the one or more driving profiles; and controlling movement of the vehicle along the test track based on the at least one of the plurality of track segments and the vehicle selecting the at least one of the one or more driving profiles; wherein causing the vehicle to select the at least one of the one or more driving profiles further comprises: determining, based on one or more vision sensors and a positioning system, a time the vehicle will take to arrive at a start point associated with a track segment of the plurality of track segments, wherein the time is a function of a distance the vehicle is from the start point associated with the track segment and a speed the vehicle is traveling; wherein causing the vehicle to select the at least one of the one or more driving profiles is based on the determined time; further comprising: identifying a sound level or a vibration level that exceeds a threshold value as the vehicle moves along the test track; and comparing the sound level or the vibration level to a baseline sound level or a baseline vibration level; further comprising: determining, based on traction between one or more wheels of the vehicle and a track segment of the plurality of track segments and one or more vision sensors; a friction level associated with the track segment of the plurality of track segments; and causing, based on the determined friction level associated with the track segment of the plurality of track segments, the vehicle to apply an estimated level of torque that will equalize an effect of the determined friction level; wherein determining the one or more driving profiles comprises: generating each of the one or more driving profiles based on the frequency characteristics, wherein the frequency characteristics include one or more of a speed of the vehicle, an acceleration of the vehicle, a deceleration of the vehicle, a steering of the vehicle, or a combination thereof; and wherein each of the one or more driving profiles uniquely correspond to a respective track segment of the plurality of track segments.

A marshalling system for controlling an autonomously operated vehicle along a test track, the marshalling system comprising: a server configured to: extract frequency characteristics associated with the vehicle, determine, based on the frequency characteristics and a deep learning model, one or more driving profiles, cause, based on at least one track segment of a plurality of track segments along the test track, the vehicle to select at least one of the one or more driving profiles, and control movement of the vehicle along the test track based on the at least one of the plurality of track segments and the vehicle selecting the at least one of the one or more driving profiles; and the vehicle configured to automatically select the at least one of the one or more driving profiles; wherein the server configured to cause the vehicle to select the at least one of the one or more driving profiles is further configured to: determine, based on one or more vision sensors and a positioning system, a time the vehicle will take to arrive at a start point associated with a track segment of the plurality of track segments, wherein the time is a function of a distance the vehicle is from the start point associated with the track segment and a speed the vehicle is traveling; wherein causing the vehicle to select the at least one of the one or more driving profiles is based on the determined time; wherein the server is further configured to: identify a sound level or a vibration level that exceeds a threshold value as the vehicle moves along the test track; and compare the sound level or the vibration level to a baseline sound level or a baseline vibration level; wherein the server is further configured to: determine, based on traction between one or more wheels of the vehicle and a track segment of the plurality of track segments and one or more vision sensors; a friction level associated with the track segment of the plurality of track segments; and cause, based on the determined friction level associated with the track segment of the plurality of track segments, the vehicle to apply an estimated level of torque that will equalize an effect of the determined friction level; wherein the server configured to determine the one or more driving profiles is further configured to: generate each of the one or more driving profiles based the frequency characteristics, wherein the frequency characteristics include one or more of a speed of the vehicle, an acceleration of the vehicle, a deceleration of the vehicle, a steering of the vehicle, or a combination thereof; and wherein each of the one or more driving profiles uniquely correspond to a respective track segment of the plurality of track segments.

One or more non-transitory computer-readable media storing processor-executable instructions that, when executed by at least one processor, cause the at least one processor to: extract frequency characteristics associated with the vehicle; determine, based on the frequency characteristics and a deep learning model, one or more driving profiles; cause, based on at least one track segment of a plurality of track segments along a test track, the vehicle to select at least one of the one or more driving profiles; and control movement of the vehicle along the test track based on the at least one of the plurality of track segments and the vehicle selecting the at least one of the one or more driving profiles; wherein the processor-executable instructions that, when executed by the at least one processor, cause the vehicle to select the at least one of the one or more driving profiles, further cause the at least one processor to: determine, based on one or more vision sensors and a positioning system, a time the vehicle will take to arrive at a start point associated with a track segment of the plurality of track segments, wherein the time is a function of a distance the vehicle is from the start point associated with the track segment and a speed the vehicle is traveling; wherein the at least one processor is further caused to: identify a sound level or a vibration level that exceeds a threshold value as the value moves along the test track; and compare the sound level or the vibration level to a baseline sound level or a baseline vibration level; wherein the at least one processor is further caused to: determine, based on traction between one or more wheels of the vehicle and a track segment of the plurality of track segments and one or more vision sensors; a friction level associated with the track segment of the plurality of track segments; and cause, based on the determined friction level associated with the track segment of the plurality of track segments, the vehicle to apply an estimated level of torque that will equalize an effect of the determined friction level; wherein determining the one or more driving profiles further comprises: generating each of the one or more driving profiles based on the frequency characteristics, wherein the frequency characteristics include one or more of a speed of the vehicle, an acceleration of the vehicle, a deceleration of the vehicle, a steering of the vehicle, or a combination thereof; and wherein each of the one or more driving profiles uniquely correspond to a respective track segment of the plurality of track segments.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
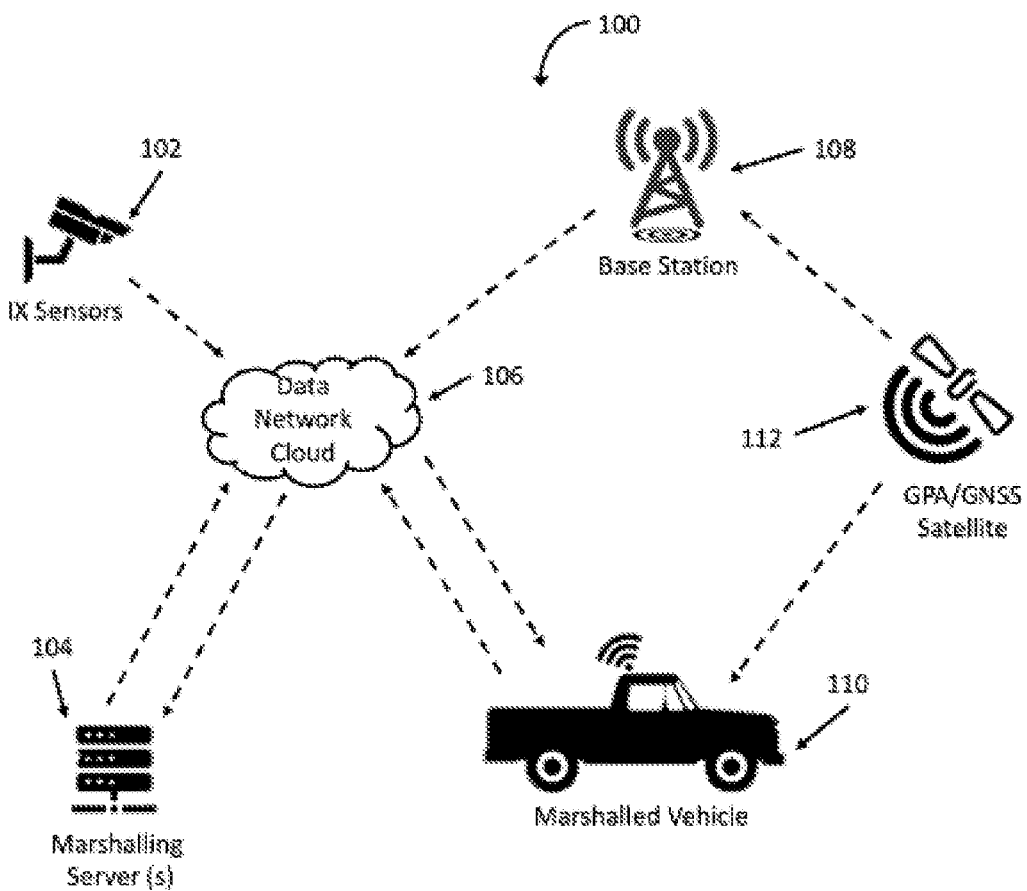
FIG. 1 illustrates an overall vehicle automated marshaling system in accordance with various implementations.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure provides for the automated marshaling of one or more vehicles along a plurality of test tracks via the generation of one or more unique driving profiles associated with a respective test track of the plurality of test tracks. For example, the utilization of a vision sensors, wheel-speed sensors, a real-time kinematic (RTK) global position system (GPS), or a combination thereof are used to ensure that accurate control parameters are deployed in the localization of the one or more vehicles. The utilization of the vision sensors, the wheel-speed sensors, the RTK GPS, or the combination thereof further provide a precise localization of the one or more vehicles on any of the plurality of test tracks at any accuracy. For example, the utilization of the vision sensors, the wheel-speed sensors, the RTK GPS, or the combination thereof ensures that the one or more vehicles account for any wheel-skid during the traverse of any of the plurality of test tracks.

The implementation of the GPS and/or a global navigation satellite system (GNSS) and RTK positioning corrections obviates the need for time consuming, tedious, and/or manual operation of each of the one or more vehicles as the one or more vehicles go through a squeak and rattle testing phase of production, in various examples. By implementing the GPS and/or the GNSS and RTK position corrections, the one or more vehicles can each traverse the squeak and rattle testing phase of production in a fully automated manner that significantly reduces the financial ramifications associated with having countless manual operators work countless hours to manually operate each of the one or more vehicles as the vehicles go through the squeak and rattle testing phase of production. Furthermore, by implementing a fully automated system and/or method for traversing the squeak and rattle testing phase of production, countless production hours are saved as the squeak and rattle testing phase of production will be completed more quickly than if the process was manually conducted. Moreover, because the present disclosure provides an automated marshaling solution to optimize the squeak and rattle testing phase of the production of a vehicle, audio and/or vibrational associated feedback exceeding an acceptable threshold is an objective determination based on the training of a deep learning model, for example. As an example, the audio and/or vibrational associated feedback may be associated with squeak and/or rattle related audio and/or vibrations as the vehicle traverses any of the plurality of test tracks.

FIG. 1 shows a system 100 illustrative of a wireless communicative relationship between several various entities. More specifically, the entities of the system 100 generally include one or more infrastructure sensors 102, one or more marshaling servers 104, a data network cloud 106, a base station 108, a vehicle 110, and a GPS/GNSS satellite 112.

The data network cloud 106, in various examples, is configured as the central entity of the system 100 that facilitates an exchange of data between the other entities included within the system 100. For example, the one or more infrastructure sensors 102 are disposed at varying frequencies within an infrastructure (e.g., at different locations or physical locations or physical spacing in the manufacturing facility). For example, the one or more infrastructure sensors 102 may be disposed at 10-meter intervals throughout the infrastructure. The one or more infrastructure sensors 102 are configured to monitor a pathway across which the vehicle 110 may traverse. The one or more infrastructure sensors 102 are also configured to send sensor data to the data network cloud 106. For example, the one or more infrastructure sensors 102 communicate sensor data to the data network cloud 106 in an instance wherein the vehicle 110 enters a field of view (e.g., within a sensing range) of any of the one or more infrastructure sensors 102.

The one or more marshaling servers 104 are configured to send one or more marshaling commands to the data network cloud 106. The one or more marshaling servers 104 are also configured to receive sensor data and/or one or more vehicle updates from the data network cloud 106. For example, the one or more vehicle updates may include odometry-related information, a pose of the vehicle, or a combination thereof. It is understood that the one or more vehicle updates may include any vehicle-related information. While a plurality of marshaling servers (e.g., the one or more marshaling servers 104) are discussed, it is understood that a single marshaling server may be implemented within the system 100.

The base station 108 is configured to communicate with both the data network cloud 106 and/or the GPS/GNSS satellite 112. The base station 108 is configured to receive GPS/GNSS positional data from the GPS/GNSS satellite 112. For example, the accuracy of the GPS/GNSS satellite 112 is dynamic, such that while a default accuracy may be within three to six meters, the GPS/GNSS satellite 112 may be even more precise. It is understood that the default accuracy of the GPS/GNSS satellite 112 may be within any range. As another example, a positional error associated with the accuracy of the GPS/GNSS satellite 112 may be introduced to the system 100 by multipath errors, clock errors, delays cause by the upper atmosphere, or a combination thereof.

The base station 108 is also configured to send RTK corrections to the data network cloud 106. For example, the RTK corrections can correct for delays and/or clock issues by tracking the phase of the GPS/GNSS satellite's 112 carrier wave for precise timing and distance. As another example, the RTK corrections can correct for GPS/GNSS errors that are varyingly correlative within a geographic region, so that if the base station 108 is at a known location, the base station 108 can broadcast its calculated corrections to mobile receivers allowing for typical positional accuracy to be highly precise (e.g., one to two centimeters). However, it is understood that the positional accuracy may be within any range. Additionally, differential GPS (DGPS) can be implemented to compare measurements at one mobile GPS/GNSS receiver (e.g., a rover (not shown)), with another stationary GPS/GNSS receiver (e.g., the base station 108). While the location of the base station 108 is known, the rover positions are calculated in reference to that point with a varying level of accuracy. It is understood that the combination of the rover and the GPS/GNSS receiver may be used along with the GPS/GNSS positioning with RTK corrections or as an alternative to the GPS/GNSS positioning with RTK corrections.

The GPS/GNSS satellite 112 is configured to communicate with both the base station 108 and the vehicle 110. The GPS/GNSS satellite 112 is configured to send GPS/GNSS positional data to the base station 108. The GPS/GNSS satellite 112 is also configured to send GPS/GNSS positional data to the vehicle 110. The vehicle 110 is configured to communicate with both the GPS/GNSS satellite 112 and the data network cloud 106. The vehicle 110 is configured to receive GPS/GNSS positional data from the GPS/GNSS satellite 112. The vehicle 110 is also configured to send the one or more vehicle updates to the data network cloud 106. Additionally, the vehicle 110 is configured to receive the one or more commands and/or the RTK corrections from the data network cloud 106.

Figure 2:
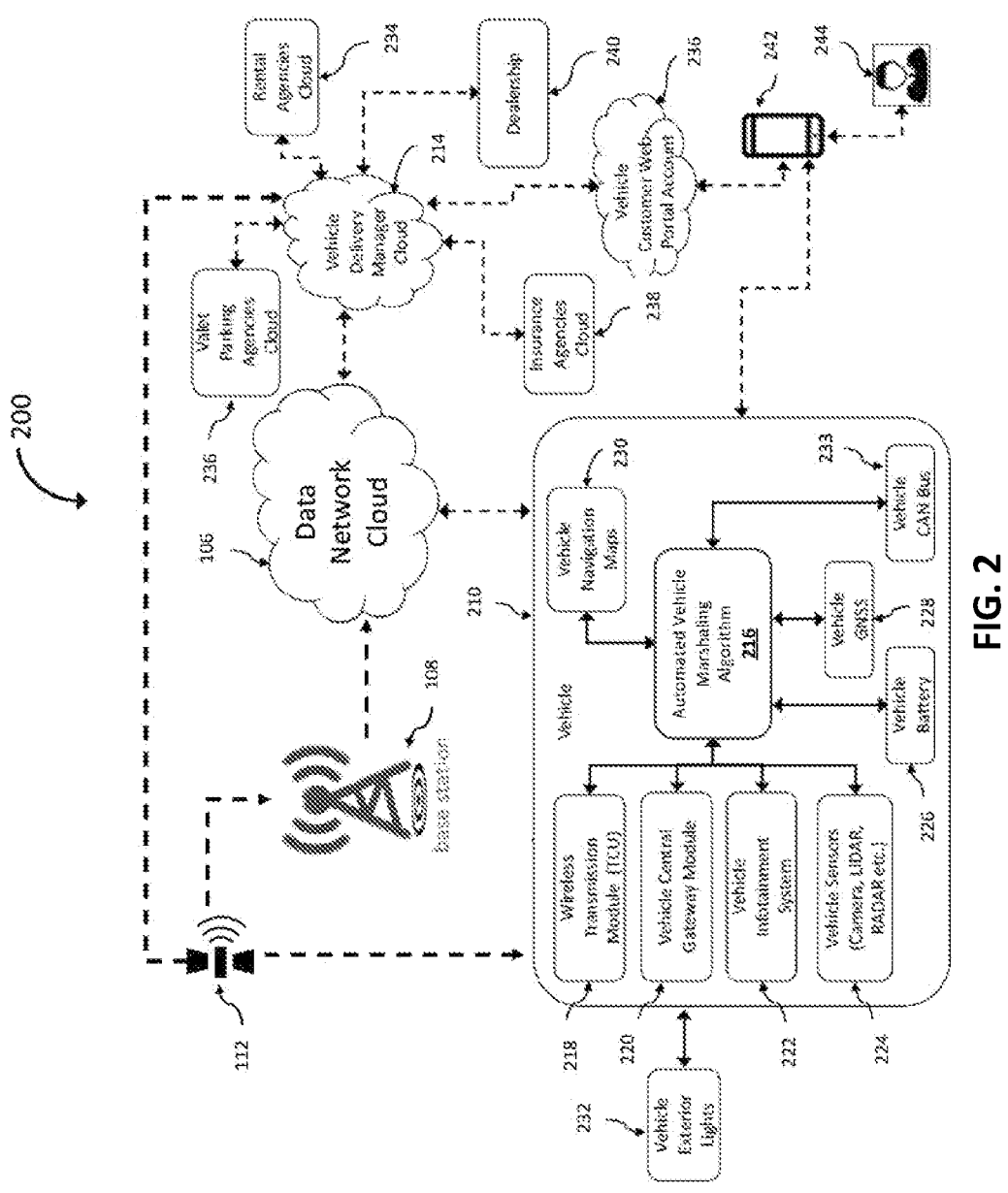
FIG. 2 illustrates an example system associated with the automated vehicle marshaling system shown in FIG. 1 in accordance with various implementations.

FIG. 2 shows a schematic block diagram illustration of a system 200. In one or more examples, the system 200 facilitates the marshaling of one or more vehicles traveling at a low speed. However, it is understood that the system 200 may marshal one or more vehicles traveling at any speed. It is also understood that the system 200 may marshal semi-autonomous vehicles and/or fully autonomous vehicles.

The system 200 generally includes the data network cloud 106, the base station 108, the vehicle 110, and a vehicle marshaling cloud 214. The data network cloud 106 operates as the central component of the system 200 configured for the management and/or facilitation of a marshaling process associated with the guided transportation of the vehicle 110. For example, the vehicle 110 is configured to exchange (e.g., send and/or receive) data with the data network cloud 106.

The vehicle 110 includes, or implements, an automated vehicle marshaling (AVM) algorithm 216, a wireless transmission module 218, a vehicle central gateway module 220, a vehicle infotainment system 222, one or more vehicle sensors 224, a vehicle battery 226, a vehicle GNSS 228, vehicle navigation maps 230, vehicle exterior lights 232, and a controller area network (CAN) vehicle bus 233. The wireless transmission module 218 may be a transmission control unit (TCU). The wireless transmission module 218 includes one or more sensors that are configured to gather data and send signals to other components of the vehicle 110. The one or more sensors of the wireless transmission module 218 may include a vehicle speed sensor (not shown) configured to determine a current speed of the vehicle 110; a wheel speed sensor (not shown) configured to determine if the vehicle 110 is traveling at an incline or a decline; a throttle position sensor (not shown) configured to determine if a downshift or upshift of one or more gears associated with the vehicle 110 is required in a current status of the vehicle 110; and/or a turbine speed sensor (not shown) configured to send data associated with a rotational speed of a torque converter of the vehicle 110. The wireless transmission module 218 communicates information, gathered by the one or more sensors, to the AVM algorithm 216. In one embodiment, the AVM algorithm 216 may be disposed as a component within the wireless transmission module 118. For example, the vehicle 110 utilizes the AVM algorithm 216 to process and send information gathered by the one or more sensors to the data network cloud 106. As another example, the vehicle 110 utilizes the AVM algorithm 216 to process and send information gathered by the one or more sensors to a user device 242 directly. The AVM algorithm 216 is configured to communicate information and/or instructions to the wireless transmission module 218 received from the data network cloud 106 and/or the user device 242.

The vehicle central gateway module 220 operates as an interface between various vehicle domain bus systems, such as an engine compartment bus (not shown), an interior bus (not shown), an optical bus for multimedia (not shown), a diagnostic bus for maintenance (not shown), or the vehicle CAN bus 233. The vehicle central gateway module 220 is configured to distribute data communicated to the vehicle central gateway module 220 by each of the various domain bus systems to other components of the vehicle 110. The vehicle central gateway module 220 is also configured to distribute information received from the AVM algorithm 216 to the various domain bus systems. The vehicle central gateway module 220 is further configured to send information to the AVM algorithm 216 received from the various domain bus systems. For example, the vehicle 110 utilizes the AVM algorithm 216 to process and send information received from the vehicle central gateway module 220 to the data network cloud 106. As another example, the vehicle 110 utilizes the AVM algorithm 216 to process and send information received from the vehicle central gateway module 220 to the user device 242 directly. The AVM algorithm 216 is configured to communicate information and/or instructions to the vehicle central gateway module 220 received from the data network cloud 106 and/or the user device 242.

The vehicle infotainment system 222 is a system that delivers a combination of information and entertainment content and/or services to a user 244 of the vehicle 110. It is also understood that the vehicle infotainment system 222 can deliver information services to anyone associated with the vehicle 110, such as a passenger of the vehicle 110, for example. As an example, the vehicle infotainment system 222 includes built-in car computers that combine one or more functions, such as digital radios, built-in cameras, and/or televisions. The vehicle infotainment system 222 communicates information associated with the built-in car computers or processors to the AVM algorithm 216. For example, the vehicle 110 utilizes the AVM algorithm 216 to process and send information received from the vehicle infotainment system 222 to the data network cloud 106. As another example, the vehicle 110 utilizes the AVM algorithm 216 to process and send information received from the vehicle infotainment system 222 to the user device 242 directly. The AVM algorithm 216 is configured to communicate information and/or instructions to the vehicle infotainment system 222 received from the data network cloud 106 and/or the user device 242.

The one or more vehicle sensors 224 may be, for example, one or more of cameras, lidar, radar, and/or ultrasonic devices. For example, ultrasonic devices utilized as the one or more vehicle sensors 224 emit a high frequency sound wave that hits an object (e.g., a wall or another vehicle) and is then reflected back to the vehicle 110. Based on the amount of time it takes for the sound wave to return to the vehicle 110, the vehicle 110 can determine the distance between the one or more vehicle sensors 224 and the object. As another example, camera devices utilized as the one or more vehicle sensors 224 provide a visual indication of a space around the vehicle 110. As an additional example, radar devices utilized as the one or more vehicle sensors 224 emit electromagnetic wave signals that hit the object and is then reflected to the vehicle 110. Based on the amount of time it takes for the electromagnetic waves to return to the vehicle 110, the vehicle 110 can determine a range, velocity, and angle of the vehicle 110 relative to the object.

The one or more vehicle sensors 224 communicate information associated with the position and/or distance at which the vehicle 110 is relative to the object to the AVM algorithm 216. For example, the vehicle 110 utilizes the AVM algorithm 216 to process and send information received from the one or more vehicle sensors 224 to the data network cloud 106. As another example, the vehicle 110 utilizes the AVM algorithm 116 to process and send information received from the one or more vehicle sensors 224 to the user device

242 directly. The AVM algorithm 216 is configured to communicate information and/or instructions to the one or more vehicle sensors 224 received from the data network cloud 106 and/or the user device 242.

The vehicle battery 226 is controlled by a battery management system (not shown) that provides instructions to the vehicle battery 226. For example, the battery management system provides instructions to the vehicle battery 226 based on a temperature of the vehicle battery 226. However, it is understood that the battery management system may provide instructions to the vehicle battery 226 based on any measure associated with the vehicle battery 226. The battery management system ensures acceptable current modes of the vehicle battery 226. For example, the acceptable current modes protect against overvoltage, overcharge, and/or overheating of the vehicle battery 226. As another example, the temperature of the vehicle battery 226 indicates to the battery management system whether any of the acceptable current modes are within acceptable temperate ranges. The battery management system associated with the vehicle battery 226 communicates information associated with the temperature of the vehicle battery 226 to the AVM algorithm 216. For example, the vehicle 110 utilizes the AVM algorithm 216 to process and send information received regarding the vehicle battery 226 to the data network cloud 106. As another example, the vehicle 110 utilizes the AVM algorithm 216 to process and send information regarding the vehicle battery 226 to the user device 242 directly. The AVM algorithm 216 is configured to communicate information and/or instructions to the vehicle battery 226 received from the data network cloud 106 and/or the user device 242.

The vehicle GNSS 228 is configured to communicate with the GPS/GNSS satellite 112 so that the vehicle 110 can determine a specific location of the vehicle 110. The vehicle navigation maps 230 can display, via a display screen (not shown), the specific location of the vehicle 110 to the user 244. The vehicle GNSS 228 communicates geographical information associated with the vehicle 110 to the AVM algorithm 216. For example, the vehicle 110 utilizes the AVM algorithm 216 to process and send information received from the vehicle GNSS 228 to the data network cloud 106. As another example, the vehicle 110 utilizes the AVM algorithm 216 to process and send information from the vehicle GNSS 228 to the user device 242 directly. The AVM algorithm 216 is configured to communicate information and/or instructions to the vehicle GNSS 228 received from the data network cloud 106 and/or the user device 242. As another example, the vehicle 110 utilizes the AVM algorithm 216 to process and send information associated with the vehicle navigation maps 230 to the data network cloud 106. As another example, the vehicle 110 utilizes the AVM algorithm 216 to process and send information from the vehicle navigation maps 230 to the user device 242 directly. The AVM algorithm 216 is configured to communicate information and/or instructions to the vehicle navigation maps 230 received from the data network cloud 106 and/or the user device 242.

The vehicle exterior lights 232 can include one or more lights that are embedded around a perimeter of the vehicle 110. For example, the vehicle exterior lights 232 include, but are not limited to, low-beam headlamps, high-beam headlamps, park lights, daytime running lights, fog lights, signal lights, side marker lights, cab lights, taillights, brake lights, center mouth brake lights, and/or reverse lights. The vehicle exterior lights 232, in some examples, are configured to turn ON and OFF in a pattern to provide visual notification or information, such as an indication of one or more faults. For example, the one or more faults can be an unplanned disconnection of the vehicle 110 from the system 200 (e.g., an infrastructure (not shown) within the system 200) that may be associated with, but is not limited to, an onboarding, offboarding, and/or re-onboarding of the vehicle 110 with the infrastructure. The vehicle 110 communicates one or more instructions to the vehicle exterior lights 232 based on the AVM algorithm 216. For example, the vehicle 110 communicates one or more instructions received from the data network cloud 106 to the vehicle exterior lights 232. As another example, the vehicle 110 communicates one or more instructions received directly from the user device 242 to the vehicle exterior lights 232.

Figure 3:
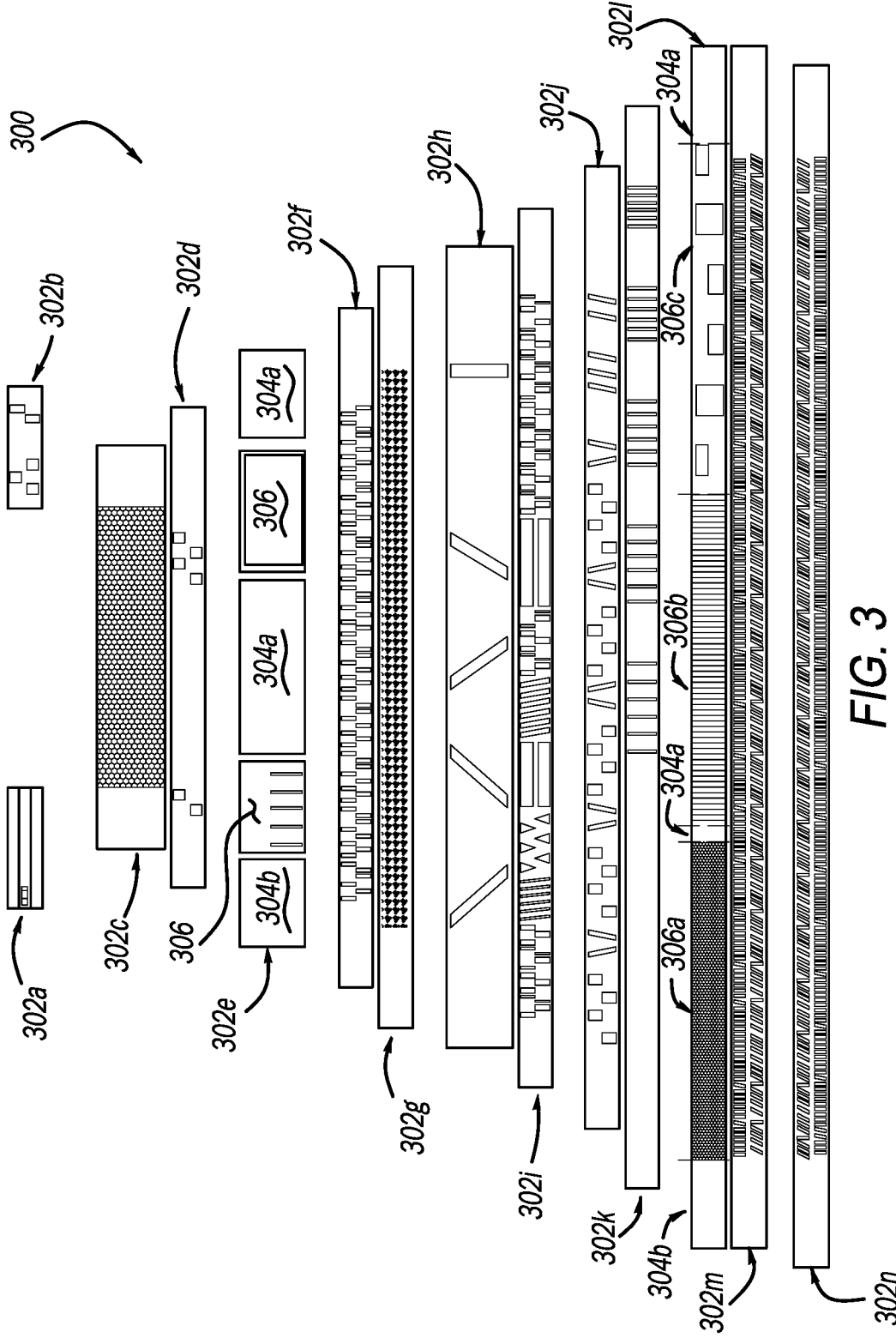
FIG. 3 illustrates a plurality of example test tracks in accordance with various implementations.

The vehicle marshaling cloud 214 wirelessly communicates (e.g., receives and/or sends instructions and/or information) with a vehicle customer web-portal account 236 accessible via the user device 242. For example, the vehicle marshaling cloud 214 is configured to guide the vehicle 110 along a particular test track of a plurality of test tracks 300, as is shown in FIG. 3. The vehicle marshaling cloud 214 wirelessly communicates with the user device 242 such as a mobile device, a display panel, and/or a computer. The vehicle 110 is also configured to wirelessly communicate directly with the user device 242. For example, the user 244 engages and/or interacts with the user device 242 via an application that organizes any information and/or instructions received from the vehicle customer web-portal account 236 and/or the vehicle 110. As another example, the user 244 may send one or more instructions to the vehicle customer web-portal account 236 such as making a selection of the particular test track of the plurality of test tracks the vehicle 110 is to traverse.

While the plurality of test tracks 300 are generally used to test the squeak and rattle effects of the vehicle 110 traversing any of the test tracks of the plurality of test tracks 300, the plurality of test tracks 300 may be used for any purpose as desired, or needed. It is additionally understood that the plurality of test tracks 300 is not an exhaustive listing of test tracks, and that any type of test track is contemplated. For example, vehicles may be tested on test tracks based on terrain unique to various parts of the world. As a further example, a vehicle in North America may be tested on different test tracks than a vehicle in South Africa. Each test track (e.g., test tracks 302a-302n) of the plurality of test tracks 300 may be traversed by the vehicle 110. Each test track of the plurality of test tracks 300 includes a smooth road segment 304a and a textured road segment 306. Each test track of the plurality of test tracks 300 begins with an initial smooth road segment 304b. However, it is understood that each test track of the plurality of test tracks 300 may begin with the textured road segment 306 as well, or other road segment.

Figure 4:
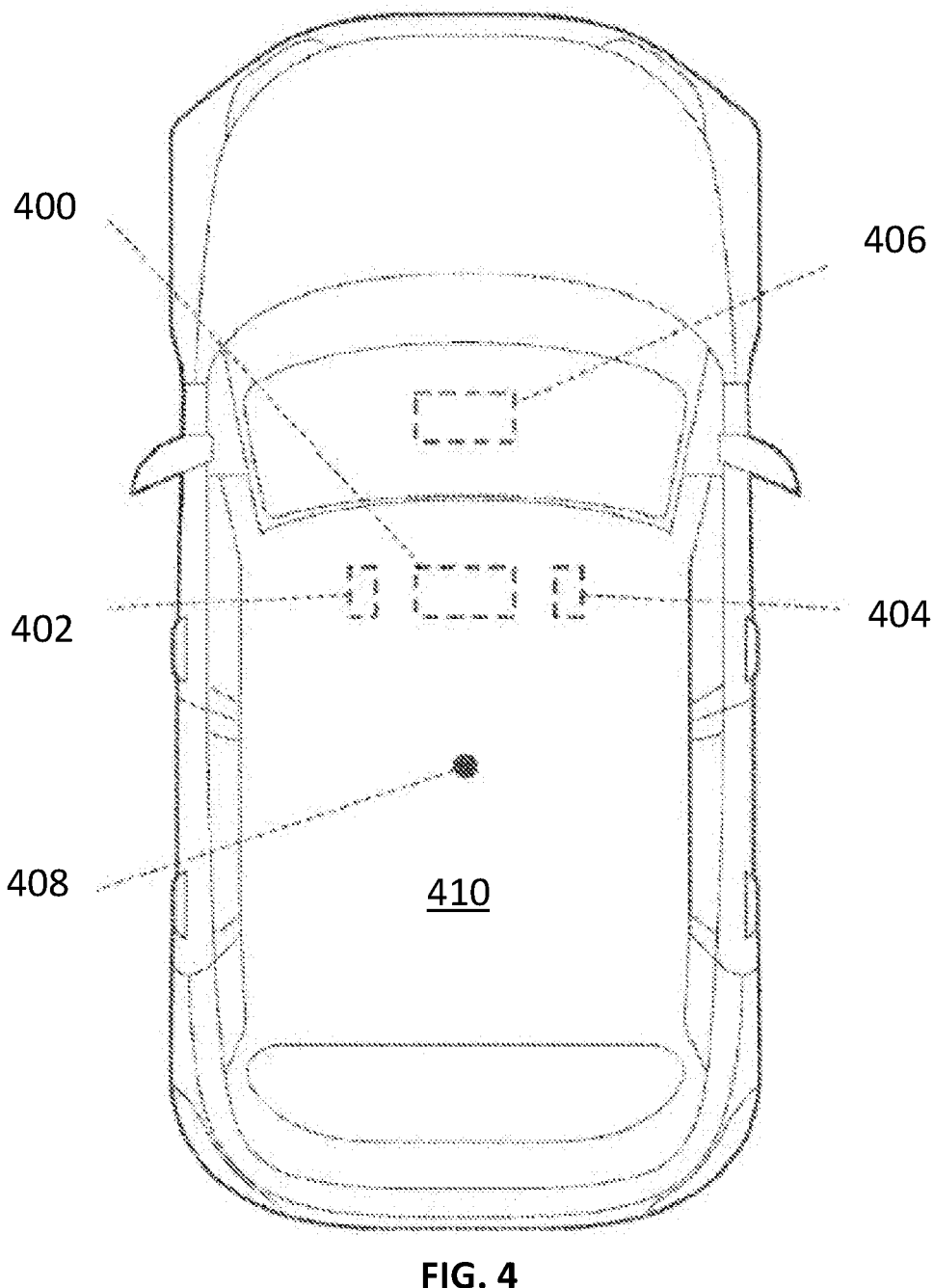
FIG. 4 illustrates an example vehicle marshaled by the systems shown in FIGS. 1 and 2 in accordance with various implementations.

Referring now to FIG. 4, in various forms, the vehicle 110 may be powered in a variety of ways, for example, with an electric motor and/or an internal combustion engine. The vehicle 110 may be any type of vehicle powered by an electric motor and/or an internal combustion engine such as a car, a truck, a robot, a plane and/or a boat, as non-limiting examples. The vehicle 110 includes a vehicle controller 400, one or more actuators 402, a plurality of on-board sensors 404, and a human machine interface (HMI) 406. The vehicle 110 has a reference point 408, that is, a specified point within the space defined by a vehicle body, for example, a geometrical center point at which respective longitudinal and lateral center axes of the vehicle 110 intersects. The reference point 408 identifies the location of the vehicle 110, for example, a point at which the vehicle 110 is located as the vehicle 110 navigates toward a waypoint.

The vehicle controller 400, in some examples, is configured or programmed to control the operation of one or more of vehicle brakes, propulsion (e.g., control of acceleration in the vehicle 110 by controlling one or more of an internal combustion engine, electric motor, hybrid engine, etc.), steering, climate control, interior and/or exterior lights, etc., as well as to determine whether and when the vehicle controller 400, as opposed to a human operator, is to control such operations. Additionally, the vehicle controller 400 is programmed to determine whether and when a human operator is to control such operations. It is understood that any of the operations associated with the vehicle 110 may be facilitated via an automated, a semi-automated, or a manual mode. For example, the automated mode may facilitate for any of the operations to be fully controlled by the vehicle controller 400 without the aid of a user. As another example, the semi-automated mode may facilitate for any of the operations to be at least partially controlled by the vehicle controller 400 and/or the user. As a further example, the manual mode may facilitate for any of the operations to be fully controlled by the user.

The vehicle controller 400 includes or may be communicatively coupled to (for example, via a vehicle communications bus) one or more processors, for example, controllers or the like included in the vehicle 110 for monitoring and/or controlling various vehicle controllers, such as a powertrain controller, a brake controller, a steering controller, etc. The vehicle controller 400 is generally arranged for communications on a vehicle communication network that can include a bus in the vehicle 110 such as a controller area network (CAN) or the like, and/or other wired and/or wireless mechanisms.

Via a vehicle network, the vehicle controller 400 transmits messages to various devices in the vehicle 110 and/or receives messages from the various devices, for example, the one or more actuators 402, the HMI 406, etc. Alternatively, or additionally, in cases where the vehicle controller 400 includes multiple devices, the vehicle communication network is utilized for communications between devices represented as the vehicle controller 400 in this disclosure. Further, as discussed below, various other controllers and/or sensors provide data to the vehicle controller 400 via the vehicle communication network.

In addition, the vehicle controller 400 is configured for communicating through a wireless vehicular communication interface with other traffic objects (e.g., vehicles, infrastructures, pedestrians, etc.), such as, via a vehicle-to-vehicle communication network. The vehicle controller 400 is also configured for communicating through a communication network, such as communicating with an infrastructure controller, for example. The vehicular communication network represents one or more mechanisms by which the vehicle controller 400 of the vehicle 110 communicates with other traffic objects, and may be one or more of wireless communication mechanisms, including any desired combination of wireless (e.g., cellular, wireless, satellite, microwave, and radio frequency) communication mechanisms and any desired network topology (or topologies when multiple communication mechanisms are utilized). Examples of vehicular communication networks include, among others, cellular, Bluetooth®, IEEE 802.11, dedicated short range communications (DSRC), and/or wide area networks (WAN), including the Internet, providing data communication services.

The vehicle actuators 402 are implemented via circuits, chips, or other electronic and/or mechanical components that can actuate various vehicle subsystems in accordance with appropriate control signals. The actuators 402 may be used to control braking, acceleration, and/or steering of the vehicle 110. The vehicle controller 400 can be programmed to actuate the vehicle actuators 402 including propulsion, steering, and/or braking based on the planned acceleration or deceleration of the vehicle 110.

The plurality of on-board sensors 404 include a variety of devices to provide data to the vehicle controller 400. For example, the plurality of on-board sensors 404 may include object detection sensors such as lidar sensor(s) disposed on or in the vehicle 110 that provides relative locations, sizes, and shapes of one or more targets surrounding the vehicle 110, for example, additional vehicles, bicycles, pedestrians, robots, drones, etc., travelling next to, ahead, and/or behind the vehicle 110. As another example, one or more of the sensors can be radar sensors fixed to one or more bumpers of the vehicle 110 that may provide locations of the target(s) relative to the location of the vehicle 110.

The object detection sensors may include a camera sensor, for example, to provide a front view, side view, rear view, etc., providing images from an area surrounding the vehicle 110. For example, the vehicle controller 400 may be programmed to receive sensor data from a camera sensor(s) and to implement image processing techniques to detect a road, infrastructure elements, etc. The vehicle controller 400 may be further programmed to determine a current vehicle location based on location coordinates, for example, GPS coordinates, received from the vehicle 110 and is indicative of a location of the vehicle 110 location from a GPS sensor.

The HMI 406 is configured to receive information from a user, such as a human operator, during operation of the vehicle 110. Moreover, the HMI 406 is configured to present information to the user, such as, an occupant of the vehicle 110. In some variations, the vehicle controller 400 is programmed to receive destination data, for example, location coordinates, from the HMI 406.

In various examples, the vehicle 110 can be autonomously guided toward a waypoint using a combination of the GPS/GNSS satellite 112, the base station 108, and/or the vehicle GNSS 228. Routing can be performed using vehicle location, distance to travel, queue in line for vehicle marshaling, etc. Other vehicles (not shown) destined to a particular waypoint operate and/or are controlled in the same way, so that movement of an entire fleet can be coordinated. The movements of the entire fleet are coordinated through a central fleet-management system that directs all traffic and logistics from an assembly plant to the waypoint. For example, the entire fleet can be organized in a pre-sorted order.

The centralized fleet-management application in various examples has complete knowledge of the vehicles in its control (e.g., current location, destination, special notes, etc.), which adds accountability and traceability to the distribution process. The fleet-management is coordinated within and/or across sites to optimize timing associated with the marshaling of each vehicle to the waypoint. For example, the waypoint may be a starting point of any test track of the plurality of test tracks. While GPS/GNSS capabilities may be relied upon to facilitate the marshaling of the vehicle 110, several other logistical applications can be used. Accordingly, the fleet-management application queues vehicles based on unique characteristics (e.g., how far the vehicle needs to travel, what traffic is along the route, when does the vehicle need to get there to line up in the correct order, etc.).

Figure 5:
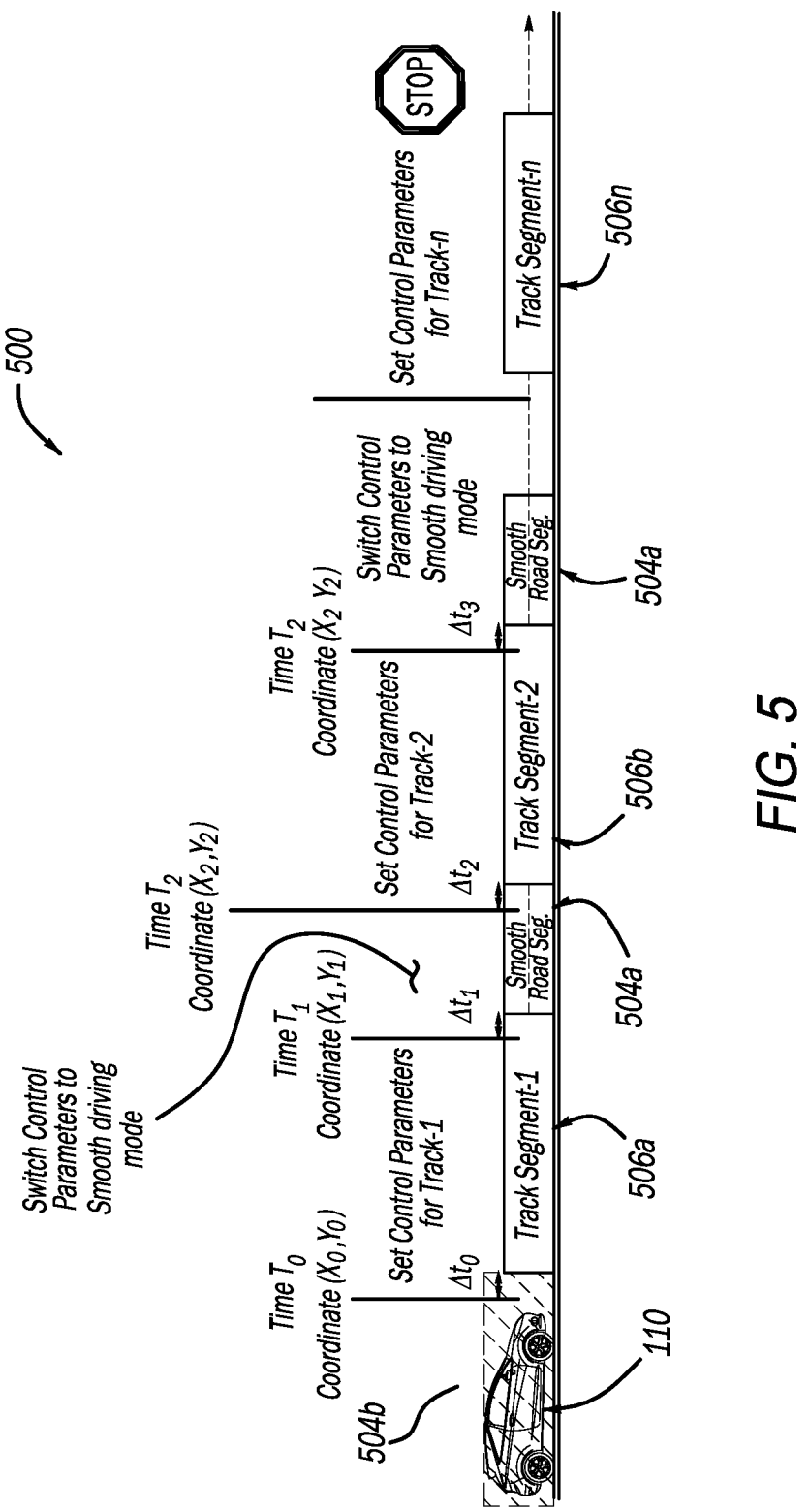
FIG. 5 illustrates an example route along a test track that an example vehicle traverses via automated marshaling by the systems shown in FIGS. 1 and 2 in accordance with various implementations.

FIG. 5 illustrates examples relating to the vehicle's 110 traverse of a test track 500 of the plurality of test tracks 300. The vehicle 110 may traverse any of the test tracks of the plurality of test tracks 300 in a segmented approach. For example, the vehicle 110 may switch between at least three driving profiles in this particular example: a first driving profile as the vehicle 110 traverses a smooth road segment 504*a*, 504*b* of the test track 500, a second driving profile as the vehicle 110 traverses a first textured road segment 506*a* of the test track 500, and a third driving profile as the vehicle 110 traverses a second textured road segment 506*b* of the test track 500. In some examples, the first textured road segment 506*a* and the second textured road segment 506*b* are different in at least some aspects. In other examples, the first textured road segment 506*a* and the second textured road segment 506*b* are different in all aspects.

It is understood that any of the test tracks of the plurality of test tracks 300 may include any number of segments, with each having similar or different characteristics and/or properties. It is also understood that any number of driving profiles may be utilized as the vehicle 110 traverses any of the test tracks of the plurality of test tracks 300. In the case wherein more track segments than the smooth road segment 504*a*, the initial smooth road segment 504*b*, and the textured road segments 506*a*, 506*b* exist as part of the test track 500 of the plurality of test tracks 300, additional driving profiles 500-*n* are implemented, each of which may require a unique calibration of a vehicle control strategy, such as activating a steering mode that continues to be modulated. For example, any of the test tracks of the plurality of test tracks 300 may require the vehicle 110 to utilize a first driving profile as the vehicle 110 traverses the smooth road segment 304*a*, 304*b*, a second driving profile as the vehicle 110 traverses the textured road segment 306, and a different driving profile as the vehicle 110 traverses different textured road segments along the same test track. For example, test track 3021 has four different road segments (e.g., 304*a*, 304*b*, and 306*a*-306*c*), which necessitates the vehicle 110 utilizing at least four driving profiles. As an example, the vehicle 110 may utilize a first driving profile as the vehicle 110 traverses the smooth road segment 304*a*, 304*b*, a second driving profile as the vehicle 110 traverses the textured road segment 306*a*, a third driving profile as the vehicle 110 traverses the textured road segment 306*b*, and a fourth driving profile as the vehicle 110 traverses the textured road segment 306*c*. However, it is understood that the vehicle 110 may utilize universal driving profiles that may be applicable to more than one type of road segment. In some examples, more than one driving profile may be used for multiple road segments. In some examples, more than one driving profile may be used for a single road segment (e.g., along different portions of the single road segment).

As the vehicle traverses the test track 500, the steering mode is modulated between positive steering and negative steering. For example, the steering mode is based on a condition of the test track 500 associated with each particular segment of the test track 500. An amount of steering, a rate, and/or a direction of steering is a function of the track surface modulation (e.g., the steering mode). Additionally, a speed of the vehicle 110, as well as an acceleration and/or deceleration of the vehicle, 110 is tuned to various locations of the vehicle 110 along a particular track segment of the test track 500. As the vehicle 110 traverses the particular track segment of the test track 500, the vehicle 110 is caused to be localized by the GPS/GNSS satellite 112 based on signals from a wheel speed of the vehicle 110, a speed of the vehicle 110 itself, or a combination thereof.

The vehicle 110 includes a localization module (e.g., the vehicle GNSS 228) that, in combination with vision sensors (e.g., the vehicle sensors 224 and/or the plurality of on-board sensors 404) of the vehicle 110, trigger switching between the driving profiles of the vehicle. The switching of the driving profiles of the vehicle 110 is triggered based on a distance (e.g., A x) the vehicle 110 is from a starting point of the next track segment of the test track 500 and/or the time (e.g., A n) the vehicle 110 will take to approach the starting point of the next track segment of the test track 500. It is understood that the distance is determined based on at least the vision sensors of the vehicle 110 and that the time is determined based at least on the wheel speed of the vehicle 110, in some examples.

The vehicle 110 employs a deep learning model trained based on data obtained from prior vehicles traversing the plurality of test tracks 300 in various examples. The deep learning model is dynamic in that the model constantly enhances pre-calibrated values for control parameters associated with the vehicle 110 utilized to instruct the vehicle 110 on how to traverse a particular test track. The pre-calibrated values are stored within the vehicle 110 (e.g., in the vehicle controller 400). As the vehicle 110 approaches the starting point of any particular track segment of the test track 500, the vehicle 110 looks up the stored control parameters from a calibration table (not shown).

Figure 6:
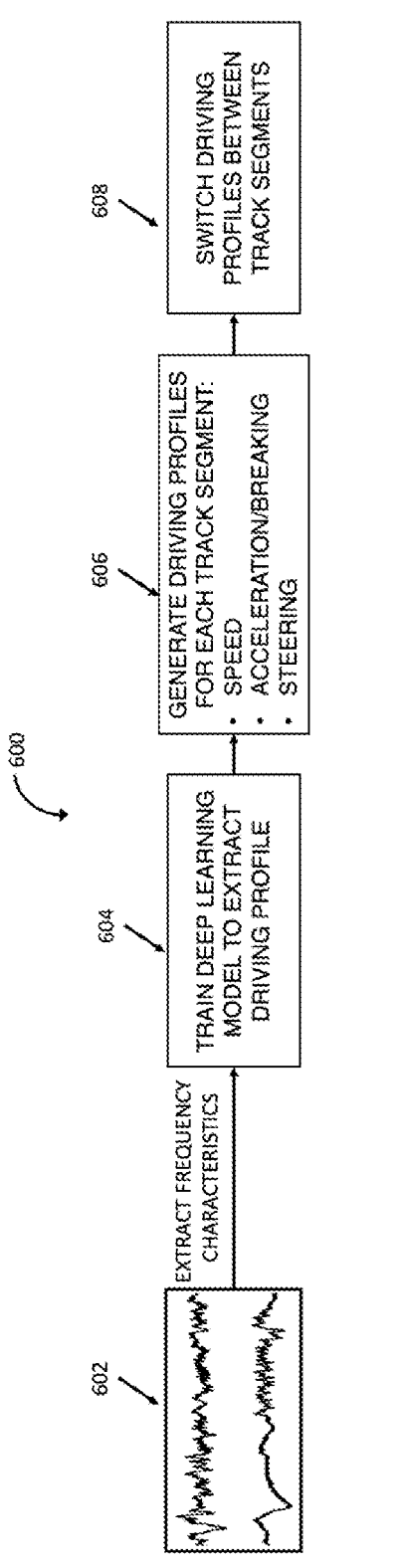
FIG. 6 illustrates a flowchart illustrating an example method for automatically switching between one or more driving profiles associated with a vehicle.

FIG. 6 depicts a method 600 illustrating a generation of a driving profile via the trained deep learning model. It is understood that the method 600 may generate any number of driving profiles via the trained deep learning model. For example, each of the driving profiles are associated with a particular test track and/or track segment from the plurality of test tracks 300. However, it is understood that one or more universal driving profiles may be generated that are applicable to more than one type of track segment and/or test track of the plurality of test tracks 300.

Generally, predictive and/or computer vision models are used to train the deep learning model so that feedback (e.g., driving data 602) to the vehicle controller 400 is provided regarding a desired vehicle speed based on track segments where a constant vehicle speed may not be achievable, and periodic acceleration, braking, and/or steering may be required. The driving data 602 is processed by the vehicle controller 400. More specifically, the vehicle controller 400 can use an algorithm to process the driving data 602. The driving data 602 includes frequency characteristics associated with the vehicle 110. The frequency characteristics include at least data associated with speed, acceleration, braking, steering, or a combination thereof.

The vehicle controller 400 is configured to extract the frequency characteristics collected as the vehicle 110 traverses any of the test tracks of the plurality of test tracks 300. The vehicle controller 400 is further configured to use the extracted frequency characteristics and/or a friction estimator (not shown) to train the deep learning model to ultimately extract a driving profile for each test track of the plurality of test tracks 300 the vehicle 110 traverses. For example, the vehicle controller 400 is further configured to use the extracted frequency characteristics and/or the friction estimator to train the deep learning model to ultimately extract a driving profile for each individual track segment of a particular test track (e.g., operation 604). For example, the driving profile may uniquely correspond to respective individual track segments of the particular test track. As another example, the driving profile provides certain parameters and/or instructions to the vehicle 110 on how to traverse a particular track segment of the particular test track.

The friction estimator is configured to estimate a level of friction between the road associated with a particular track segment of any of the plurality of test tracks 300 and the vehicle wheels. For example, the friction estimator estimates the level of friction of the road associated with the particular track segment of any of the plurality of test tracks 300 based on a measure of traction between the vehicle wheels and the road and/or one or more vision sensors (e.g., the vehicle sensors 224 and/or the plurality of on-board sensors 404) of the vehicle 110. The friction estimator is also configured to provide desired torque to the vehicle wheels so that the vehicle 110 can overcome track segments of any of the test tracks where the vehicle wheels have a higher probability of skidding. For example, a desired torque is any measure of torque necessary to provide enough power to the vehicle wheels to mitigate any level of skidding associated with vehicle 110.

The one or more driving profiles are generated based on the extracted frequency characteristics and/or the training of the deep learning model (e.g., operation 606). The driving profile includes an operation setting that facilitates a particular speed, acceleration/braking, and/or steering capability of the vehicle 110 as it traverses a particular track segment and/or test track of the plurality of test tracks 300. As the one or more driving profiles are generated, the driving profiles are stored in the vehicle's 110 wireless transmission module 218. As the vehicle 110 is marshaled toward a waypoint associated with the starting point of a particular track segment of the plurality of test tracks 300, the one or more vision sensors of the vehicle 110, in combination with the vehicle GNSS 228 and/or wheel speed sensor signals detect a change in the track segment. For example, the change can be the determination of the distance (e.g., A x) and/or the determination of the time (e.g., A t). Based on the change in the track segment, the vehicle's 110 wireless transmission module 218 automatically requests that the vehicle controller 400 follows the stored driving profile parameters from the pre-trained model specific to that particular track segment of the plurality of test tracks. While the vehicle 110 is configured to utilize the one or more driving profiles generated by the deep learning model, the vehicle 110 is also configured to utilize a pre-calibrated driving profile based on a particular track segment of a particular test track. For example, the pre-calibrated driving profile is used when the vehicle 110 is able to traverse the particular track segment of the particular test track at a fixed vehicle speed. In either scenario, it is understood that the switching of the driver profile (e.g., operation 608) is done automatically. However, it is understood that the driving profile may be manually switched as well.

Figure 7:
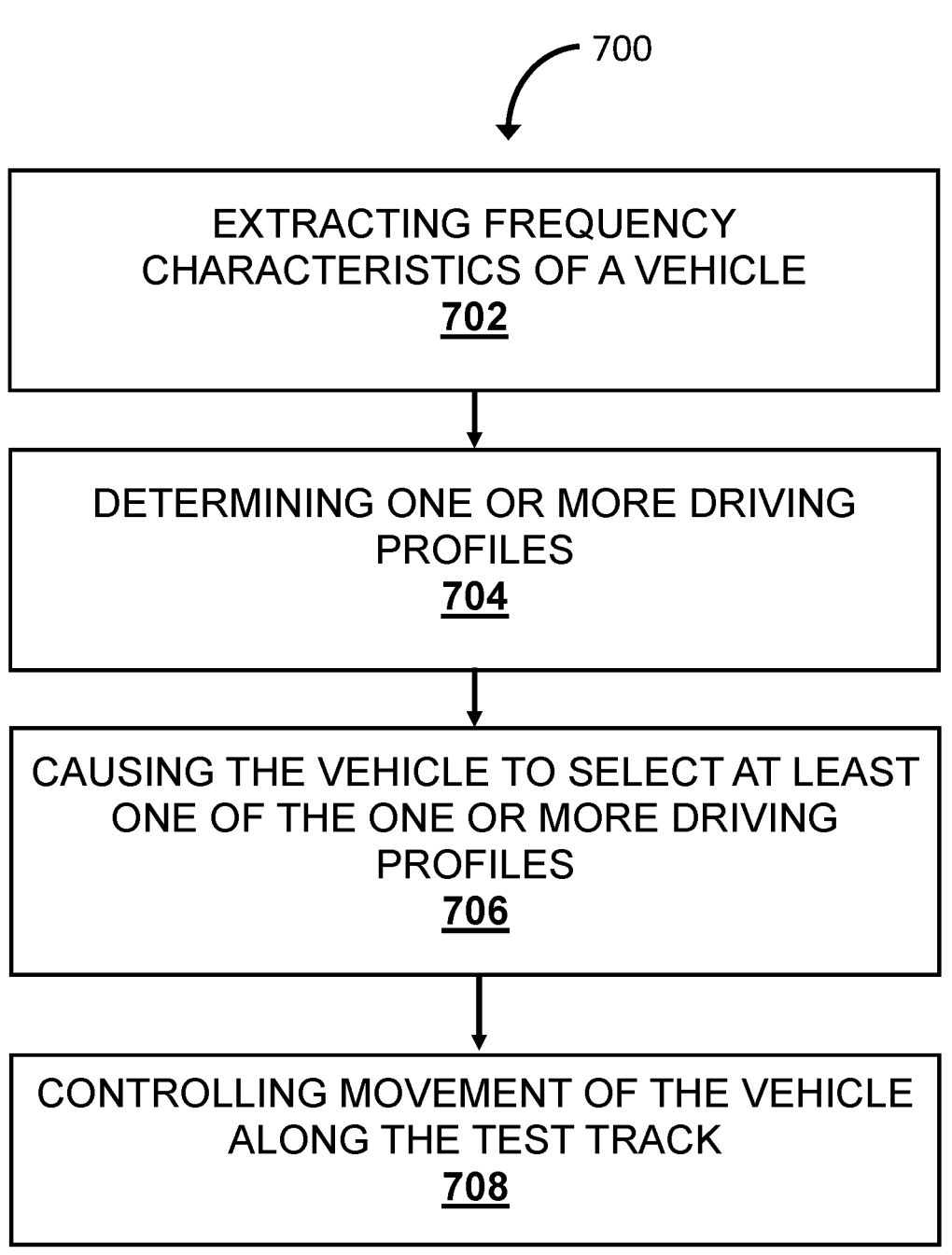
FIG. 7 illustrates a flowchart illustrating another example method for automatically switching between one or more driving profiles associated with a vehicle.

FIG. 7 is a flow chart illustrating an example method 700 for marshaling an autonomously operated vehicle (e.g., the vehicle 110) along a test track (e.g., of the plurality of test tracks 300). At operation 702, frequency characteristics associated with the vehicle 110 are extracted. For example, the frequency characteristics include one or more of a speed of the vehicle 110, an acceleration of the vehicle 110, a deceleration of the vehicle 110, a steering of the vehicle 110, or a combination thereof.

At operation 704, one or more driving profiles are determined. For example, the one or more driving profiles are determined based on the frequency characteristics and/or a deep learning model. As another example, each of the one or more driving profiles uniquely correspond to a respective track segment of a plurality of track segments. In an embodiment, the one or more driving profiles are generated based on the frequency characteristics.

At operation 706, the vehicle 110 is caused to select at least one of the one or more driving profiles. For example, the vehicle 110 is caused to select at least one of the one or more driving profiles based on at least one track segment of the plurality of track segments along the test track. In an embodiment, a time the vehicle 110 will take to arrive at a start point associated with the track segment of the plurality of track segments is determined. For example, the determination of the time the vehicle 110 will take to arrive at the start point associated with the track segment of the plurality of track segments is based on one or more vision sensors (e.g., the vehicle sensors 224 and/or the plurality of on-board sensors 404) and/or a positioning system (e.g., the vehicle GNSS 228). As another example, the time is a function of a distance the vehicle 110 is from the beginning of the track segment and/or the speed the vehicle is traveling. As a further example, causing the vehicle 110 to select the least one of the one or more driving profiles is based on the determined time.

At operation 708, movement of the vehicle 110 along the test track is controlled. For example, movement of the vehicle 110 along the test track is controlled based on the at least one of the plurality of track segments and/or the vehicle 110 selecting the at least one of the one or more driving profiles. In an embodiment, a sound level and/or a vibration level is identified as the vehicle 110 traverses the test track. The sound level and/or the vibration level is compared to a baseline sound level and/or a baseline vibration level to determine if the level exceeds a threshold value. It is understood that a repair to the vehicle 110 may be necessary in a case wherein the sound level and/or the vibration level exceeds the threshold value. In another embodiment, a friction level associated with the track segment of the plurality of track segments is determined. For example, the friction level associated with the track segment of the plurality of track segments is determined based on traction between one or more wheels of the vehicle 110 and a track segment of the plurality of track segments and/or one or more vision sensors. The vehicle is further caused to apply an estimated level of torque that will equalize an effect of the determined friction level. For example, the vehicle is further caused to apply the estimated level of torque that will equalize the effect of the determined friction level based on the determined friction level associated with the track segment of the plurality of track segments.

Thus, one or more examples provide for a generation of one or more driving profiles based on a deep learning model of a vehicle that may be trained to ultimately control a movement of the vehicle along varying track segments of correspondent test tracks.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method of controlling an autonomously operated vehicle along a test track, the method comprising:

extracting frequency characteristics associated with the vehicle;

determining, based on the frequency characteristics and a deep learning model trained based on the extracted frequency characteristics, one or more driving profiles;

causing, based on at least one track segment of a plurality of track segments along the test track, the vehicle to select at least one of the one or more driving profiles;

retrieving, from a calibration table stored in the vehicle, pre-calibrated values for control parameters associated with the at least one track segment; and controlling movement of the vehicle along the test track based on the at least one of the plurality of track segments, the pre-calibrated values for the control parameters, and the vehicle selecting the at least one of the one or more driving profiles.

2. The method of claim 1, wherein causing the vehicle to select the at least one of the one or more driving profiles further comprises:

determining, based on one or more vision sensors and a positioning system, a time the vehicle will take to arrive at a start point associated with a track segment of the plurality of track segments, wherein the time is a function of a distance the vehicle is from the start point associated with the track segment and a speed the vehicle is traveling.

3. The method of claim 2, wherein causing the vehicle to select the at least one of the one or more driving profiles is based on the determined time.

4. The method of claim 1, further comprising:

identifying a sound level or a vibration level that exceeds a threshold value as the vehicle moves along the test track; and comparing the sound level or the vibration level to a baseline sound level or a baseline vibration level.

5. The method of claim 1, further comprising:

determining, based on traction between one or more wheels of the vehicle and a track segment of the plurality of track segments and one or more vision sensors, a friction level associated with the track segment of the plurality of track segments; and causing, based on the determined friction level associated with the track segment of the plurality of track segments, the vehicle to apply an estimated level of torque that will equalize an effect of the determined friction level.

6. The method of claim 1, wherein determining the one or more driving profiles comprises:

generating each of the one or more driving profiles based on the frequency characteristics, wherein the frequency characteristics include one or more of a speed of the vehicle, an acceleration of the vehicle, a deceleration of the vehicle, a steering of the vehicle, or a combination thereof.

7. The method of claim 1, wherein each of the one or more driving profiles uniquely correspond to a respective track segment of the plurality of track segments.

8. A marshalling system for controlling an autonomously operated vehicle along a test track, the marshalling system comprising:

a server configured to:

extract frequency characteristics associated with the vehicle, determine, based on the frequency characteristics and a deep learning model trained based on the extracted frequency characteristics, one or more driving profiles, cause, based on at least one track segment of a plurality of track segments along the test track, the vehicle to select at least one of the one or more driving profiles, retrieve, from a calibration table stored in the vehicle, pre-calibrated values for control parameters associated with the at least one track segment; and control movement of the vehicle along the test track based on the at least one of the plurality of track segments, the pre-calibrated values for the control parameters, and the vehicle selecting the at least one of the one or more driving profiles; and the vehicle configured to automatically select the at least one of the one or more driving profiles.

9. The marshalling system of claim 8, wherein the server configured to cause the vehicle to select the at least one of the one or more driving profiles is further configured to:

determine, based on one or more vision sensors and a positioning system, a time the vehicle will take to arrive at a start point associated with a track segment of the plurality of track segments, wherein the time is a function of a distance the vehicle is from the start point associated with the track segment and a speed the vehicle is traveling.

10. The marshalling system of claim 9, wherein causing the vehicle to select the at least one of the one or more driving profiles is based on the determined time.

11. The marshalling system of claim 8, wherein the server is further configured to:

identify a sound level or a vibration level that exceeds a threshold value as the vehicle moves along the test track; and compare the sound level or the vibration level to a baseline sound level or a baseline vibration level.

12. The marshalling system of claim 8, wherein the server is further configured to:

determine, based on traction between one or more wheels of the vehicle and a track segment of the plurality of track segments and one or more vision sensors, a friction level associated with the track segment of the plurality of track segments; and cause, based on the determined friction level associated with the track segment of the plurality of track segments, the vehicle to apply an estimated level of torque that will equalize an effect of the determined friction level.

13. The marshalling system of claim 8, wherein the server configured to determine the one or more driving profiles is further configured to:

generate each of the one or more driving profiles based the frequency characteristics, wherein the frequency characteristics include one or more of a speed of the vehicle, an acceleration of the vehicle, a deceleration of the vehicle, a steering of the vehicle, or a combination thereof.

14. The marshalling system of claim 8, wherein each of the one or more driving profiles uniquely correspond to a respective track segment of the plurality of track segments.

15. One or more non-transitory computer-readable media storing processor-executable instructions that, when executed by at least one processor, cause the at least one processor to:

extract frequency characteristics associated with a vehicle;

determine, based on the frequency characteristics and a deep learning model trained based on the extracted frequency characteristics, one or more driving profiles;

cause, based on at least one track segment of a plurality of track segments along a test track, the vehicle to select at least one of the one or more driving profiles;

retrieve, from a calibration table stored in the vehicle, pre-calibrated values for control parameters associated with the at least one track segment; and control movement of the vehicle along the test track based on the at least one of the plurality of track segments, the pre-calibrated values for the control parameters, and the vehicle selecting the at least one of the one or more driving profiles.

16. The one or more non-transitory computer-readable media of claim 15, wherein the processor-executable instructions that, when executed by the at least one processor, cause the vehicle to select the at least one of the one or more driving profiles, further cause the at least one processor to:

determine, based on one or more vision sensors and a positioning system, a time the vehicle will take to arrive at a start point associated with a track segment of the plurality of track segments, wherein the time is a function of a distance the vehicle is from the start point associated with the track segment and a speed the vehicle is traveling.

17. The one or more non-transitory computer-readable media of claim 15, wherein the at least one processor is further caused to:

identify a sound level or a vibration level that exceeds a threshold value as the value moves along the test track; and compare the sound level or the vibration level to a baseline sound level or a baseline vibration level.

18. The one or more non-transitory computer-readable media of claim 15, wherein the at least one processor is further caused to:

determine, based on traction between one or more wheels of the vehicle and a track segment of the plurality of track segments and one or more vision sensors, a friction level associated with the track segment of the plurality of track segments; and cause, based on the determined friction level associated with the track segment of the plurality of track segments, the vehicle to apply an estimated level of torque that will equalize an effect of the determined friction level.

19. The one or more non-transitory computer-readable media of claim 15, wherein determining the one or more driving profiles further comprises:

generating each of the one or more driving profiles based on the frequency characteristics, wherein the frequency characteristics include one or more of a speed of the vehicle, an acceleration of the vehicle, a deceleration of the vehicle, a steering of the vehicle, or a combination thereof.

20. The one or more non-transitory computer-readable media of claim 15, wherein each of the one or more driving profiles uniquely correspond to a respective track segment of the plurality of track segments.

* * * * *